C. Tyler.
Revolving Rake.
No. 101,189.         Patented Mar. 22. 1870.
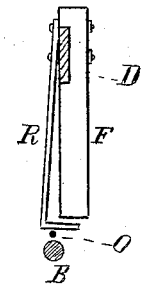
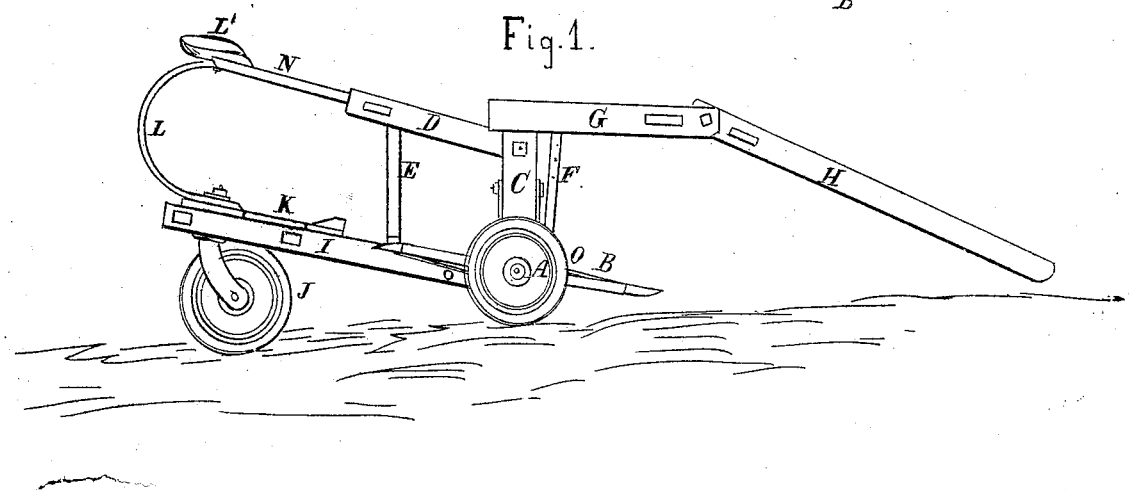
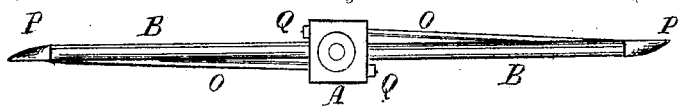
Cyrus Tyler   Inventor.
Samuel J. Parker  
A. McLucas    Witnesses.
A. McLucas
Justice of the Peace

United States Patent Office.

CYRUS TYLER, OF DRYDEN, NEW YORK.

Letters Patent No. 101,189, dated March 22, 1870.

IMPROVEMENT IN HORSE HAY-RAKES.

The Schedule referred to in these Letters Patent and making part of the same.

*To all whom it may concern:*

I, CYRUS TYLER, of Dryden, Tompkins county, New York, have invented an Improved Horse-Rake, of which the following is a specification.

My object is to make more useful the revolving horse-rake in common use; and

My invention consists mainly in the appendages which I add to it, the nature of which will be apparent as I describe them.

Figure 1 is a side view of my improved rake.

Figure 2 is a side view of my rake-teeth, as fast to the axle-head.

Figure 3 is a front view of my spring-stop, used in revolving my rake.

In fig. 1, A is one of two small wheels on the ends of the rake-head, and B the teeth, which project each side of the axle-head, having metal points which are fast to the head by the rods O; C D E are the ordinary frame-work, by which the rake is operated; F is a special stud, fast to the piece D of the frame, and on it is a spring which stops the teeth, and the raking commences anew after the dumping of the rake; G is the frame-piece that holds the thills H to the rake; and I is the seat-frame, that, hinged to the head and resting in part on it, mainly bears on the swivel-wheel J, having the platform K and the seat for the operator on it, by the spring L. The operator, seated on this platform, which, by the swivel-wheel and hinges of the head, accommodates itself to every direction and motion of the rake; by the lever N, in connection with the traction of the horse in the thills; by the part or piece E and the spring stud F, dumps and otherwise operates the rake.

In fig. 2, A' is the head and axle or axle-head, and B the teeth having the metal points P, which are held to the axle-head by the rods O by the nuts Q, whereby the teeth are braced and made stouter.

In fig. 3, F is the stud, fast to the frame-piece D, and R is the spring which, at the end of each dumping revolution, stops the rake-teeth by bearing on the rods O just over the anterior half of the tooth B.

The advantages and uses of my invention are apparent to those skilled in the art to which it appertains.

Claims.

1. The arrangement of the rods O, so attached to the tips P of the teeth and to the rake-head A' as to act as a support for the teeth, substantially as described.

2. The combined whole, made by the wheeled head A A', the rod-supported teeth B O, operator's platform, wheel, and seat K J L', lever and dumping-apparatus N D C F, and thills, with connecting rods H G, arranged substantially as set forth.

CYRUS TYLER.

Witnesses:
SAMUEL J. PARKER,
A. M. LUCAS.